United States Patent
Casalina

[15] 3,660,223
[45] May 2, 1972

[54] RIGID, FLEXIBLE AND COMPOSITE SOLID OBJECTS HAVING CELLULOSE CONTAINING RICE HULL PARTICLES AND RADIATION INDUCED POLYMER AND METHOD OF MAKING SAME

[72] Inventor: Samuel L. Casalina, 71 Paddon Road, Watsonville, Calif. 95076

[22] Filed: Sept. 16, 1968

[21] Appl. No.: 762,173

Related U.S. Application Data

[63] Continuation-in-part of Ser. No. 720,331, Apr. 10, 1968.

[52] U.S. Cl. ............................161/168, 161/162, 161/265, 204/159.12, 260/17.4 GC, 264/128
[51] Int. Cl. .....................................B32b 5/16, B32b 21/02
[58] Field of Search .......................204/159.12; 264/22, 128; 106/38.22; 161/162, 168, 268, 270, 265; 260/17.4 GC

[56] References Cited

UNITED STATES PATENTS

| | | | |
|---|---|---|---|
| 2,710,276 | 6/1955 | Mottet et al. | 161/268 |
| 2,817,617 | 12/1957 | Rogers | 161/162 |
| 3,077,417 | 2/1963 | Kenaga | 204/159.12 |
| 3,287,203 | 11/1966 | Elmendorf | 161/268 |
| 3,372,042 | 5/1968 | Wright | 106/38.22 |
| 3,420,761 | 1/1969 | Feibush | 204/159.12 |

Primary Examiner—John T. Goolkasian
Assistant Examiner—George W. Moxon, II
Attorney—Warren, Rubin, Burcker and Chickering

[57] ABSTRACT

Discrete, cellulose containing, rice hull particles are impregnated with a monomer, usually a liquid, having a radiation activatable reaction group, molded under pressure to place the particles in substantially touching relation and form an article, and subjected to high-intensity ionizing radiation to polymerize the monomer and bind the particles into an object of stable shape. Additionally, the monomer may be selected to produce objects that are rigid and hard or flexible and resilient. A composite layered article is also disclosed.

7 Claims, 3 Drawing Figures

INVENTOR.
SAMUEL L. CASALINA

BY Warren, Rubin, Brucker & Chickering ATTORNEYS

RIGID, FLEXIBLE AND COMPOSITE SOLID OBJECTS HAVING CELLULOSE CONTAINING RICE HULL PARTICLES AND RADIATION INDUCED POLYMER AND METHOD OF MAKING SAME

This is a continuation-in-part application based upon my earlier filed, pending application Ser. No. 720,331, filed Apr. 10, 1968.

The present invention relates to the formation of solid, organic composite articles from discrete particles, and more particularly relates to the formation of such articles by the use of ionizing radiation.

I have previously discovered that a solid cohesive object may be formed from a liquid monomer and discrete forestry particles such as sawdust, wood chips, bark and nut shells. Since these forestry particles, consisting principally of lignocellulose, represent a waste material in the forestry industry which is not heretofore been efficiently used, this earlier discovery has been highly advantageous. In addition, the ability to cast or mold the monomer and lignocellulose particle mixture into many shapes and configurations and about other articles has been found to be very beneficial. This process and the product formed thereby are fully described in my patent application, Ser. No. 642,768.

In addition, I have also previously discovered that sheets of lignocellulose such as fiberboard may be impregnated with selected types of liquid monomers and irradiated to produce a flexible, composite sheet having increased durability and strength. This process and the product produced thereby are fully described and set forth in my patent application, Ser. No. 645,293.

Still further, for certain applications it has been found to be advantageous to impregnate relatively large (as compared to wood chips or sawdust) wooden pieces with a liquid monomer by means of high pressure. The impregnated pieces are then irradiated to produce an article having improved surface durability with the strength of the article being primarily derived from the inherent strength of the wood before treatment.

Notwithstanding the various advantages which have been found to accrue as a result of the use of the above described processes and products, it is an object of the present invention to provide a solid cohesive object which is formed from an inexpensive particulate material and which has improved strength and durability.

It is another object of the present invention to provide a solid cohesive article which is formed from a particulated material and monomer and which is flexible and resilient.

Still another object of the present invention is to provide a solid article having the advantages of high strength and surface durability and in addition flexibility and resiliency.

Additional objects and advantages of the present invention will be apparent from the specification in conjunction with the drawings, in which.

Figure 1:
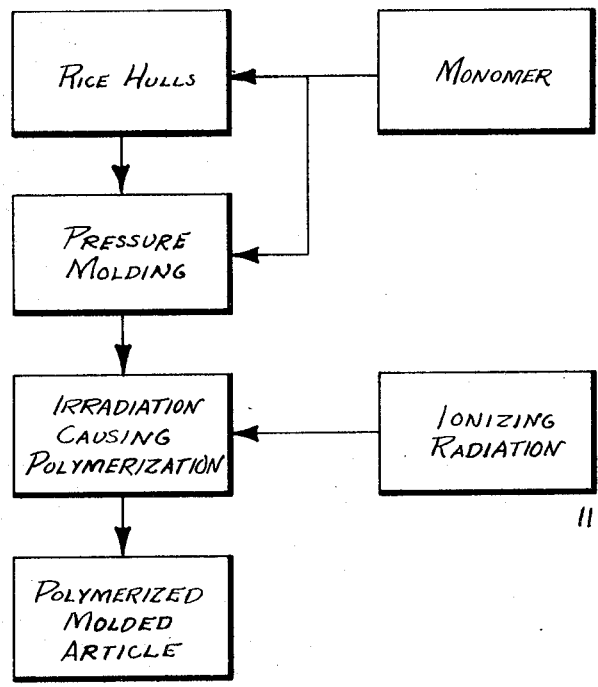
FIG. 1 is a schematic representation of the steps of the method of the present invention according to one embodiment.

I have recently discovered that a substantial increase in the strength and durability of the article produced can be achieved if a mixture of rice hulls and radiation-activatable monomer is employed instead of a mixture of lignocellulose particles and monomer, as set forth in my earlier application. Thus, as is set forth in FIG. 1, the article of the present invention is formed by placing in a mold a compact mixture of discrete, cellulose containing, rice hull particles and a monomer. The monomer has a radiation-activatable reaction group which causes polymerization with the cellulose in the rice hulls when subjected to ionizing radiation. The forming operation includes applying pressure to the rice hulls within the mold to compact then into substantially touching relation (separated only by entrapped air or monomer film or both). The addition of monomer can be either before or after pressure molding, as represented in FIG. 1 by the arrows from "Monomer" to both "Rice Hulls" and "Pressure Molding." After the forming operation, the mixture is subjected to ionizing radiation for a sufficient period of time so that the radiation dose is such as to effect at least partial polymerization of the monomer. As used throughout the specification and claims, the terms "rice hull particles" and "rice hulls" shall means those waste materials which are typically separated from the rice kernel during the de-hulling operation and include such particles as stems and leaf material.

Rice hulls are presently of little or no economic value and often necessitate substantial expense and inconvenience in their disposal. The product and process of the present invention, therefore, affords a highly advantageous use of this heretofore waste material. The rice hulls may be mixed with the monomer directly as they come from the hulling equipment or they may be passed through a screen or series of screens of pre-determined mesh in order to select particle size. Moreover, the rice hull particles may also be taken from the hulling equipment and ground or pulverized into smaller particles and then passed through a screen for mixing with the monomer. For purposes of decorative effect, ground rice hulls may be combined with whole rice hulls and mixed with the monomer for radiation polymerization.

In order to vary the physical characteristics of the article or product produced, it has been found that selection of the monomer is very important. If one kind of monomer is selected, the product produced has a strength which can be as much as 2½times greater than the strength of a similar article produced from lignocellulose particles. If another monomer is selected, the article produced, even though formed of a particulate material, is highly flexible and resilient. Examples of monomers suitable for use in the process and product of the present invention are set forth in U.S. Pat. No. 3,077,417 to Kenaga, and the description of the several types of monomers therein given by structural formulae are incorporated by reference. Among the monomers described, it is preferred to use the esters of acrylates, methacrylates and ethacrylates represented by the structural chemical formula:

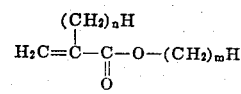

wherein $n$ is an integer from 0 to 2 and $m$ is an integer from 1 to 4, both inclusive. Thus, the preferred monomers are methyl methacrylate, ethyl acrylate, propyl acrylate and butyl methacrylate and their mixtures. These monomers are commercially available in a liquid and powdered, partially polymerized form, and they have radiation-activatable reaction groups which polymerize with the cellulose in the rice hull particles.

An advantageous catalyst which promotes the radiation polymerization of these monomers is carbon tetrachloride ($CCl_4$). The radiation dose required for the process of the present invention is reduced when between 5 and 30 percent of the weight of the combination of monomer and catalyst is carbon tetrachloride.

While these monomers will produce a solid cohesive object when combined with cellulose containing, rice hull particles and irradiated in accordance with the present invention, the selection of certain monomers, as above set forth, results in a substantial difference in the physical properties of the end product. When methyl methacrylate is used, a rigid product having high strength and surface durability results. When ethyl acrylate is employed, a flexible and resilient and yet high-strength product is produced. Thus, the monomers earlier discovered to be graftable to a pre-formed lignocellulose sheet to produce a flexible sheet have been found to be advantageously employed with rice hull particles to produce an article which has the advantages of being castable to almost any shape and yet is flexible and resilient.

As will be seen from the examples set forth herein, the article produced when methyl methacrylate and rice hulls are irradiated is essentially inflexible relative to the flexibility achievable when ethyl acrylate is employed. Accordingly, it is possible to achieve variations in the flexibility and strength of the articles produced by using mixtures of methyl methacrylate and ethyl acrylate. In addition, it has been discovered that parboiling the rice hulls prior to mixture with a monomer such as ethyl acrylate will result in even greater flexibility of the object produced.

Irradiation of the rice hull particle and monomer mixture can be effected at ambient or moderately elevated temperature and ambient or elevated pressure. The radiation dosage will vary with such factors as the radiation energy the specific monomer used, and the nature and quantity of the catalyst or promoter, if any is present, within the monomer. The molding pressure is typically between 20 and 100 psi, and the ratio of monomer to cellulose-containing, particles may be between about 3.8 to 1 and about 0.05 to 1. It has been found to be preferable to use a monomer-cellulose ratio of between 0.15–1.0 to 1. The cost of manufacturing articles in accordance with the present invention is primarily dictated by the cost of the monomer employed and the cost of radiation. This is true since the rice hulls themselves do not constitute a substantial part of the product cost. Accordingly, it is important to be able to minimize the amount of monomer employed while still maintaining the desired strength or resiliency characteristic of the article produced. As will be seen in the examples, an increase in the strength of the article of more than two times can be demonstrated over similar articles produced from lignocellulose particles when a ratio of only 0.7 to 1 of monomer to rice hulls is employed.

As is true for the product and process set forth in my previous application, Ser. No. 642,768, I have found that radiation for the product and process of the present invention may consist of or include significant amounts of electro-magnetic radiation, preferably having wave lengths between 0.01 and 14A. Alternatively or additionally, radiation suitable for the process and product of the present invention may consist of or include significant amounts of electrons having energies between about $10^{-3}$ and 15 mev and beta rays having energies between 0.5 and 15 mev. The radiation source may be radio nuclide or an electronic device such as an X-ray tube. Radio nuclides such as cobalt 60, iridium 192, and cesium 137 may be formed as a by-product of nuclear reactor operations. Alternatively, the element metal, such as cobalt 59, may be subjected to neutron bombardment to form radio active cobalt 60.

In the process and product of the present invention, the total absorbed radiation dose sufficient to effect at least partial polymerization of methyl methacrylate monomer and 9 percent $CCl_4$ with rice hulls has been found to be at least about 0.6 megarad of penetrating ionizing radiation. The unit of radiation "megarad" represents the absorption of $10^8$ ergs of energy per gram of material irradiated, A radiation dose sufficient to cause at least 65 percent polymerization of the monomer is referred to through out this specification and claims as "partial polymerization." The phrase "substantially complete polymerization" shall means between about 90 to 100 percent polymerization An absorbed dose of about 1.0 megarad is required to achieve substantially complete polymerization when methyl methacrylate and about 9 percent $CCl_4$ is used. The radiation intensity set forth in my previously referred to application, Ser. No. 642,768, are suitable for use in the present invention in order to achieve the increased strength and durability of the irradiated product once the absorbed dose is about about 1.0 megarad. Depending upon the intensity, the period of exposure is typically about 20 minutes to 4 hours, although longer and shorter exposures are feasible as radiation intensities vary.

It has been found, however, that irradiation at high intensity for a short period of time is preferable to irradiation at lower intensity for a longer period of time for a number of reasons. First, it is very often more economical to operate a high intensity radiation source and increase the volume of articles which are exposed to the source. Secondly, the radiation activatable monomers suitable for use in the process of the present invention usually are subject to substantial evaporation. Accordingly, radiation over a long period of time may result in evaporation which causes voids in the product, a change in the ratio of monomer to rice hull particles or a deterioration in the surface smoothness or durability. Lastly, irradiation at high intensity, which results in a rapid polymerization of the monomer with the rice hulls, may result in increased strength of the product by reason of a more complete polymerization and greater strength in the bonding between the polymer and the rice hulls. Therefore, when the dose rate is increased, the strength and uniformity of the product and process of the present invention is also increased.

Figure 3:
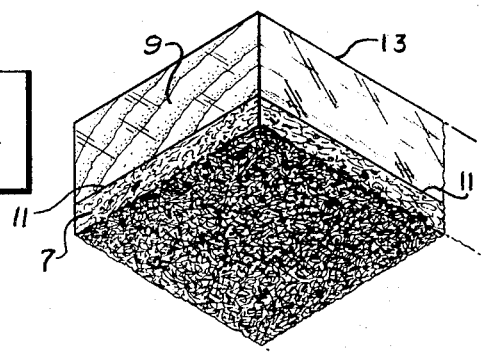
FIG. 3 is a perspective view of a layered article produced according to the method set forth in FIG. 2.
Figure 2:
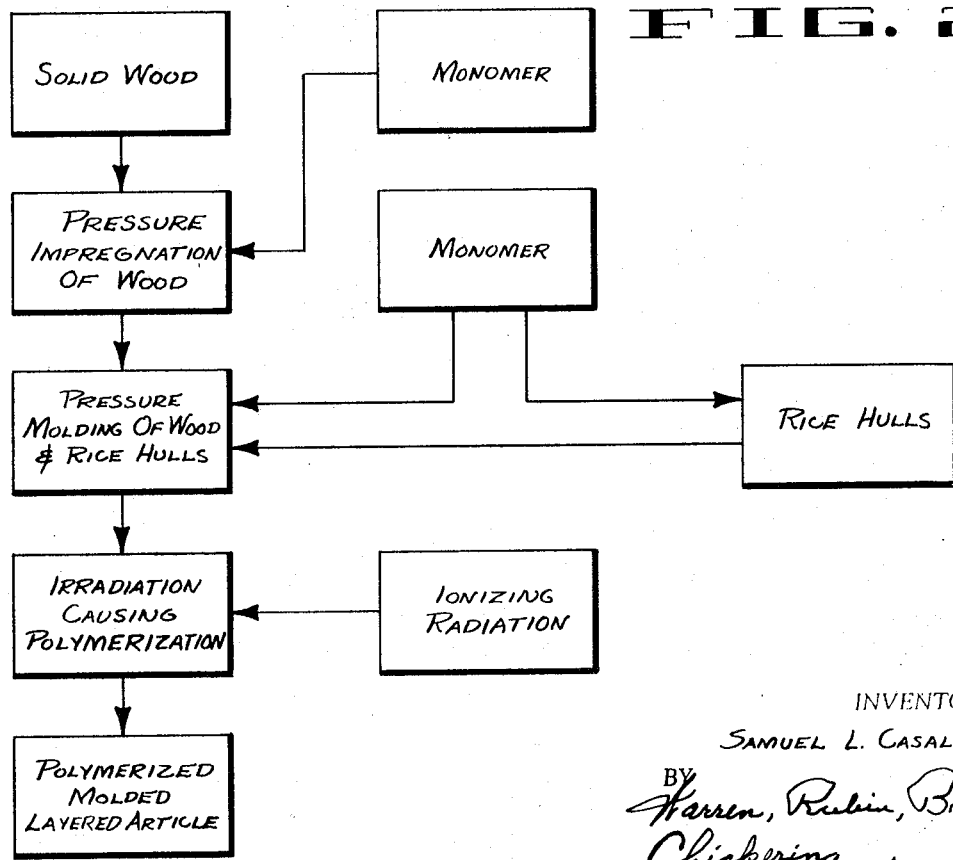
FIG. 2 is a schematic representation of the steps of the method of the present invention according to an alternate embodiment.

Referring now to FIGS. 2 and 3 of the drawing, a method and a product of the present invention is set forth in which the advantages of high strength and surface durability as well as resiliency are incorporated into a single product. It has been found that large pieces of solid wood can be pressure impregnated with a monomer having a radiation-activatable reaction group and irradiated to produce an article having high surface strength and durability. One application in which such a product has found wide spread use is in inlaid or parquet flooring. A disadvantage of previous floor tiles, however, has been that the tile is often laid upon concrete, which results in a flooring having very little resiliency.

The product set forth in FIG. 3 overcomes some of the previous difficulties encountered with such inlaid floor tiles by providing a layer of resilient material 7 on the lower side of the impregnated wood member 9, which results in a layered composite tile having high surface strength and substantial resiliency. This polymerized layered article can be produced in a manner which is easily integrated with the method for production of articles from monomer and rice hulls, as will best be understood by reference to FIG. 2. First, the solid wooden layer 9 undergoes pressure impregnation with a monomer, such as methyl methacrylate in order that the end product has a high surface hardness. Secondly, rich hulls and a monomer such as ethyl acrylate may be mixed and pressure molded as layer 7 on one side of the wood member 9. This is preferably accomplished by placing the pressure impregnated wooden member 9 at the bottom of a mold and packing the rice hull monomer mixture on top thereof to the desired thickness. The layered combination is then exposed to ionizing radiation to cause polymerization of both monomers with respective cellulose bearing material and to cause a bond at the interface 11 between the wood and the particulated rice hull mixture. It is quite feasible to vary the order of some of the above steps. For example, wooden layer 9 may be pressure impregnated with monomer while in the mold. Moreover, rice hulls may have the monomer added while also in the mold (as indicated by the arrows). The same level of radiation intensity satisfactory for producing the flexible or rigid articles formed exclusively from particulated material will be satisfactory for the irradiation of the layered material.

It is also feasible to make the layered article by forming the entire floor tile out of rice hull particles. This can be accomplished by forming layer 9 of a mixture of rice hulls and methyl methacrylate, which will produce a high strength product. On top of this layer, a second layer 7 of rice hulls and ethyl acrylate can be placed. There will be some diffusion of the two monomers at interface 11 which will result in a gradation of the flexibility from very flexible in layer 7 to very hard in layer 9. Irradiation of the combination, however, will produce a floor tile having a very hard surface 13 and yet a resilient base layer 7. As will be understood, this approach can be used in other applications where it is desirable to have a gradation between a rigid surface and a resilient surface The improved physical characteristics of the product produced by the process of the present invention over previous articles, and particularly the high strength and flexibility which is achievable with the process of the present invention, may be clearly demonstrated by the following examples.

EXAMPLE I

Small castings of fir (conifer) sawdust were prepared by grinding the sawdust and passing it through a screen in order to screen out large particles. The sawdust was pressed into 1 inch square by ½ inch thick forms and a monomer solution consisting of 91 percent methyl methacrylate and 9 percent carbon tetrachloride was added. The molds were sealed with a plastic bag and irradiated within a ring of 10 cobalt 60 rods having a total of 11,000 Curies of that radio nuclide for 3 hours. The dose rate was approximately 1 megarad per hour. In an exactly analogous fashion, rice hulls were ground and passed through the same screen. They were placed in molds of the same size with the same monomer composition added and irradiated by the same source for the same length of time.

The castings were tested by means of a Wabash hydraulic press having a 4-inch ram by loading the cubes on their opposite 1-inch square faces and applying force axially until fracture was observed. The results are the number of pounds necessary to produce a complete single fracturing.

TABLE 1

| Material | Samples | | |
|---|---|---|---|
| | No. 1 | No. 2 | No. 3 |
| Fir Sawdust | 2,780 | 2,900 | 2,950 |
| Rice Hulls | 3,640 | 3,730 | 3,680 |

EXAMPLE II

Small castings of fir (conifer) sawdust were prepared as set forth in Example I. The sawdust was, however, pressed into 15/16-inch diameter cylinders which were 1½ inches in height. A 91 percent methyl methacrylate — 9 percent carbon tetrachloride monomer mixture was used, and the sawdust irradiated by a 33,000 Curie source having a configuration which caused the dose rate to be about 6 megarads per hour. The cylinders were irradiated for 25 minutes. Rice hull particles were ground, screened and pressed into a cylinder of the same size. The monomer was the same, and the radiation conditions were also the same. The results of compression tests with the cylinders being loaded by a hydraulic press on their ends are set forth in Table 2. The numbers are the pounds required to produce a complete fracturing. The reduction in the total strength over the examples set forth in Table 1 is the result of the difference in the physical configuration of the articles tested. The increase in strength of the rice hull particles over that of the sawdust is again, however, strikingly demonstrated. The ratio of monomer to sawdust and monomer to rice hulls was approximately 0.7 or 42 percent monomer by weight.

TABLE 2

| Material | | Samples | | | |
|---|---|---|---|---|---|
| | No. 1 | No. 2 | No. 3 | No. 4 | Average |
| Sawdust | | 251 | 259 | 262 | — | 257 |
| Rice Hulls | 11 | 611 | 599 | 582 | 591 | 596 |

EXAMPLE III

Relatively thin sheets of the product of the present invention were prepared by casting and irradiation. One set of sheets was formed from a mixture of rice hulls and ethyl acrylate monomer having 9 percent by weight carbon tetrachloride. The ratio of monomer to rice hulls was approximately 0.25 to 1 or about 20 to 21 percent monomer. The sheets were cast to have the following dimensions: 2 by 3 by ¼ inch thick. A second set of sheets was cast having the same dimensions and using methyl methacrylate. A third of sheets was cast using parboiled rice hulls and ethyl acrylate. All sheets were irradiated by a 33,000 Curie source having an approximate dose rate of 6 megarads per hour for 25 minutes. The sheets were then clamped or secured along one of the 2 inch sides and a bending force applied at the opposite side approximately 2½ inch away. Table 3 sets forth the force required, in grams, to bend or displace the sheets through 90°. As indicated in the table, the flexibility of the sheet produced by ethyl acrylate is much greater than the sheets produced by methyl methacrylate. In addition, it will be seen that the use of parboiled rice hulls results in a further increase in flexibility.

TABLE 3

| Material | Monomer | Samples | | |
|---|---|---|---|---|
| | | No. 1 | No. 2 | No. 3 |
| Rice Hulls | Methyl Methacrylate | No Measurable Displacement at 2000 grams | | |
| Rice Hulls | Ethyl Acrylate | 890 | 897 | 881 |
| Rice Hulls (Parboiled) | Ethyl Acrylate | 770 | 771 | |

EXAMPLE IV

Rice hulls and a monomer solution comprised of 91 percent ethyl acrylate and 9 percent carbon tetrachloride were cast into a first set of strips measuring 1½ by 3 by 3/16 of an inch. The ratio of monomer to rice hulls was approximately 0.25 to 1 or 20 to 21 percent monomer. Similarly, sawdust and the same ethyl acrylate monomer were cast into strips of the same size. All strips were irradiated by a 33,000 Curie source arranged in a configuration providing a dose rate of approximately 6 megarads per hour for 25 minutes. The samples were then tested in tension until failure. The results are given in Table 4 as pounds required to cause failure. As will be seen from Table 4, the improved strength of the rice hulls, even when cast in flexible strips, over that of the lignocellulose composite strips is again demonstrated.

TABLE 4

| Material | Monomer | Samples | | | | |
|---|---|---|---|---|---|---|
| | | no. 1 | no. 2 | no. 3 | no.4 | average |
| Rice Hulls | Ethyl Acrylate | 17.5 | 17.0 | 16.5 | 17.5 | 17.1 |
| Sawdust | Ethyl Acrylate | 14.0 | 13.5 | 13.0 | 13.5 | 13.5 |

What is claimed is:

1. A solid cohesive object formed from particulate material and having stability of shape comprising:
   a. a multiplicity of discrete, cellulose containing, rice hull particles compacted into substantially touching relation to act as structural elements and formed to a predetermined shape of said object; and
   b. a polymer disposed in and substantially filling the interstices between said rice hull particles, said polymer being formed from a monomer having a radiation-activatable reaction group, said monomer being included in a ratio of at least 0.05 monomer to said rice hull particles by weight and being radiation polymerized with the cellulose in said rice hull particles by ionizing radiation, and said polymer cohesively binding said particles in the shape of said object.

2. An object as defined in claim 1 wherein the ratio of said monomer to said rice hull particles is in the range of between about 3.8 to 1 and about 0.05 to 1 by weight.

3. An object as defined in claim 1 wherein the ratio of said monomer to said rice hull particles is in the range of between about 1.0 to 1 and about 0.15 to 1 by weight.

4. An object as defined in claim 1 wherein said polymer is formed from a liquid monomer having the chemical structural formula

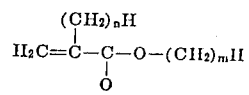

where $n$ is an integer from 0 to 2 and $m$ is an integer from 1 to 4, both inclusive.

5. An object as defined in claim 4 wherein said monomer is methyl methacrylate.

6. An object as defined in claim 4 wherein said monomer is ethyl acrylate.

7. An object as defined in claim 6 wherein said rice hull particles are parboiled.

* * * * *

UNITED STATES PATENT OFFICE
CERTIFICATE OF CORRECTION

Patent No. 3,660,223          Dated May 2, 1972

Inventor(s) Samuel L. Casalina

It is certified that error appears in the above-identified patent and that said Letters Patent are hereby corrected as shown below:

Column 1, line 43, "particulate" should read -- particulated -- . Column 3, line 50, "element" should read -- elemental -- ; line 59, after "irradiated", change the comma (,) to a period (.); line 65, after "polymerization", insert a period -- . -- ; line 72, "about about" should read -- above about -- . Column 5, in Table 2, line 70, after "Rice Hulls", cancel "11". Column 6, line 13, after "2 1/2" change "inch" to read -- inches -- ; line 29, in Table 3, under column heading "No. 3", for "Rice Hulls (Parboiled)", insert -- 779 -- .

Signed and sealed this 2nd day of January 1973.

(SEAL)
Attest:

EDWARD M. FLETCHER, JR.
Attesting Officer

ROBERT GOTTSCHALK
Commissioner of Patents